United States Patent
Owen et al.

[11] 3,894,934
[45] July 15, 1975

[54] CONVERSION OF HYDROCARBONS WITH MIXTURE OF SMALL AND LARGE PORE CRYSTALLINE ZEOLITE CATALYST COMPOSITIONS TO ACCOMPLISH CRACKING CYCLIZATION, AND ALKYLATION REACTIONS

[75] Inventors: Hartley Owen, Belle Mead; Edward J. Demmel, Pitman, both of N.J.

[73] Assignee: Mobil Oil Corporation, New York, N.Y.

[22] Filed: Dec. 19, 1972

[21] Appl. No.: 316,614

[52] U.S. Cl. ............ 208/78; 208/71; 208/74; 208/120; 208/155; 208/164; 252/417
[51] Int. Cl. .............. C10g 37/02; C01b 33/28
[58] Field of Search ......... 208/78, 120, 71, 74, 155, 208/164

[56] References Cited
UNITED STATES PATENTS

| | | | |
|---|---|---|---|
| 2,956,003 | 10/1960 | Marshall et al. | 208/74 |
| 3,679,576 | 7/1972 | McDonald | 208/74 |
| 3,748,251 | 7/1973 | Demmell et al. | 208/74 |
| 3,756,942 | 9/1973 | Cattanach | 208/137 |
| 3,758,403 | 9/1973 | Rosinski et al. | 208/120 |
| 3,760,024 | 9/1973 | Cattanach | 260/673 |
| 3,764,520 | 10/1973 | Kimberlin et al. | 208/111 |
| 3,767,568 | 10/1973 | Chen | 208/134 |
| 3,769,202 | 10/1973 | Plank et al. | 208/111 |

Primary Examiner—Delbert E. Gantz
Assistant Examiner—G. E. Schmitkons
Attorney, Agent, or Firm—Charles A. Huggett; Carl D. Farnsworth

[57] ABSTRACT

A combination operation utilizing a mixture of small and large pore crystalline aluminosilicates having activity and selectivity for cracking hydrocarbons and cyclization of gaseous products of cracking in a dual conversion zone operation is described. The catalyst components used contribute to the function of each other to produce material of relatively high octane rating and the small pore crystalline material is a ZSM-5 type of catalyst.

10 Claims, 1 Drawing Figure

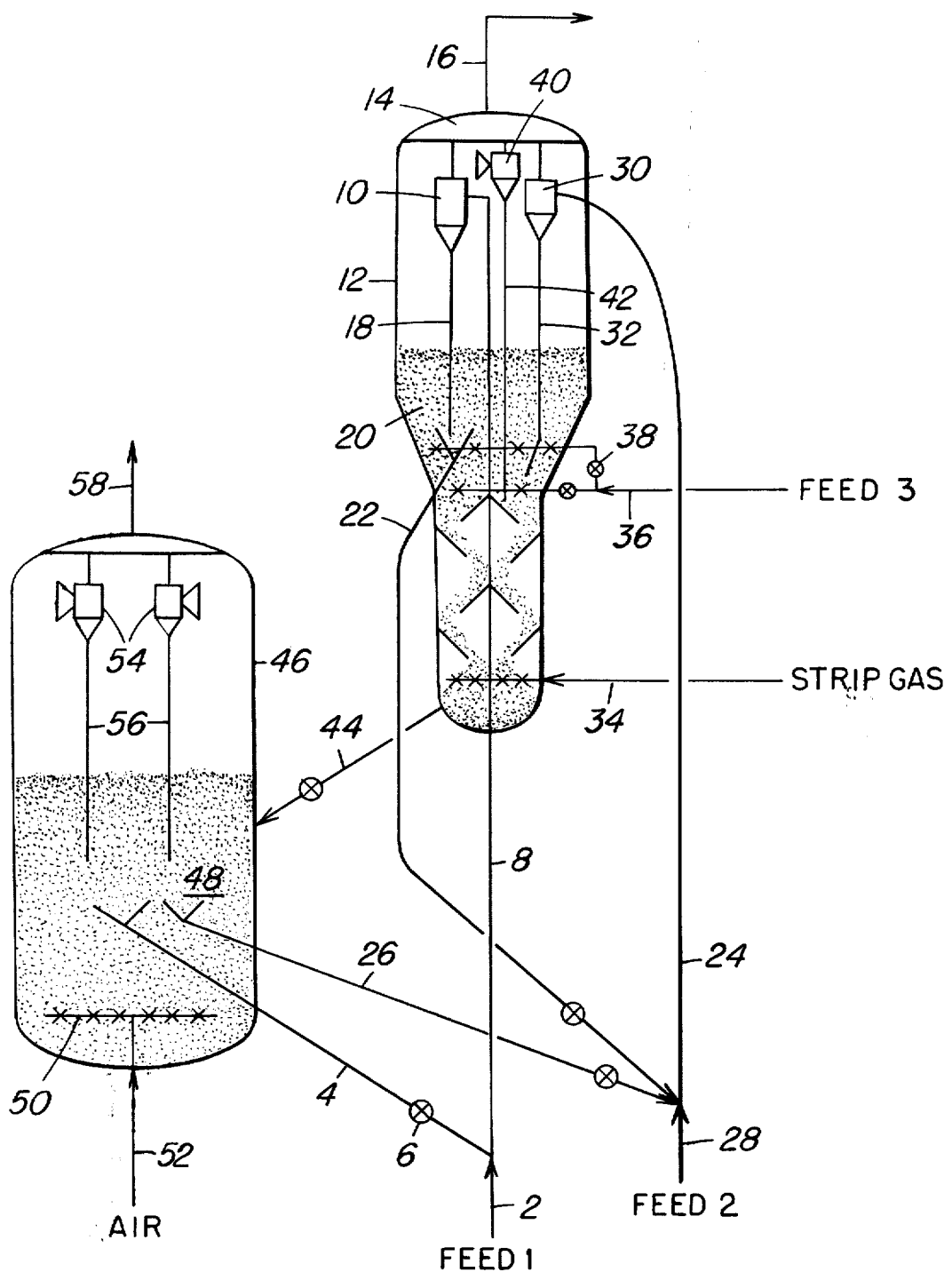

CONVERSION OF HYDROCARBONS WITH MIXTURE OF SMALL AND LARGE PORE CRYSTALLINE ZEOLITE CATALYST COMPOSITIONS TO ACCOMPLISH CRACKING CYCLIZATION, AND ALKYLATION REACTIONS

BACKGROUND OF THE INVENTION

The field of catalytic cracking and particularly dense or dilute fluid phase catalytic operations have been undergoing progressive development since early 1940. Thus as new experience was gained in operating and design parameters, new catalyst compositions were developed which required a further refinement of known operating and design parameters so as to extract maximum efficiency from the combination operation. With the advent of high activity crystalline zeolite cracking catalyst development, we once again find ourselves in a new area of operation requiring ever further refinements in order to take advantage of the new catalyst activity, selectivity and operating sensitivity. The present invention is concerned with a combination operation which relies upon a combination of catalyst functions mutually contributing to accomplish upgrading of available refinery feed material.

SUMMARY OF THE INVENTION

The present invention relates to the combination and method of hydrocarbon conversion utilizing a catalyst system comprising two substantially different crystalline aluminosilicates contributing to the functions of the other within the constraints of the combination. In a more particular aspect the present invention is concerned with a dual conversion zone system comprising riser reactors which are operationally enhanced by a catalyst combination comprising a large pore and a smaller pore size crystalline aluminosilicate combination working substantially independently of one another in separate riser conversion zones on particular reaction conversion mechanism but jointly contributing in the overall processing operation to the production of high yields of desired product including gasoline boiling range material.

The invention contemplates in the combination a first high temperature, above about 1000°F., short contact time, less than 5 seconds, hydrocarbon conversion in a riser reactor utilizing a dispersed phase fluid catalytic cracking operation designed to emphasize the production of high quality cracked naphtha and a highly unsaturated $C_3/C_4$ hydrocarbon stream suitable for cyclization purposes and/or alkylation. The short contact time high temperature riser reactor conversion stage of the operation discharges its hydrocarbon product catalyst suspension at a temperature up to about 1200°F. directly into a cyclone separator which separates the suspension and discharges separated hot catalyst particles into an adjacent relatively dense fluid bed of catalyst particles. The separated hydrocarbon products are recovered for passage to a product separation zone not shown. A portion of the discharged hot catalyst recovered in a fluid bed of catalyst is passed to a second riser reactor as explained below. The remaining fluid bed of catalyst is moved generally downward as a dense fluid bed of catalyst into a stripping zone. The fluid bed of catalyst is stripped with a suitable stripping gas such as steam or light dry gases material before the catalyst is returned to a regeneration zone.

The catalyst combination used in the combination operation comprises a multi-function catalyst relying upon distinctly different average pore size crystalline aluminosilicate components. Generally speaking the catalyst combination comprises a large pore crystalline zeolite cracking catalyst of the X or Y faujasite variety in operational combination with a smaller pore size ZSM-5 type of crystalline aluminosilicate conversion catalyst. This multi-function catalyst combination is used, for example, to convert a gas oil feed in a first riser reactor at a high temperature of at least 1000°F. to particular products and the ZSM-5 catalyst component of the combination is used in a second riser reactor maintained at a temperature generally less than 1000°F. to react propane or propane containing material or similar material with itself or with a higher boiling aromatic containing material such as reformate or a highly aromatic catalytic naphtha to produce a material providing a markedly higher octane rating. The propane containing material stream may be brought to the second riser at the temperature it is normally recovered or produced in a refinery light ends receiving plant. This eliminates the need for expensive heat exchange arrangements required to bring a gaseous stream comprising propane and/or propylene up to reactor temperature since the heat requirement of the combination is easily supplied by hot catalyst recovered from the first stage riser reactor alone or in combination with regenerated catalyst passed directly from the regenerator to the second riser reactor. The propane containing gaseous feed stream may be a recycle stream obtained from the catalytic cracking light ends recovery plant and/or from other refinery processing units such as the crude distillation tower, reforming, hydrocracking, alkylation, isomerization and chemical manufacturing facilities where available.

In the combination operation of this invention it is proposed to operate the first riser reactor well over 1000°F. and as high as about 1250°F. at an operating pressure in the range of 1 to 10 atmospheres. The second riser reactor to which a propane containing feed is passed is operated at a temperature selected from within the range of 500° to 1000°F. depending upon the reactions to be accomplished therein utilizing a pressure selected from within the range of 1 to 10 atmospheres. That is, for reactions accomplished in the second riser reactor directed to the production of aromatics, temperatures in the range of 500 to 800°F. are preferred with higher temperatures in the range of 800°F. up to about 1000°F. preferred for the cyclization of low boiling hydrocarbons by the ZSM-5 type catalyst.

The present invention also contemplates recycling separately or in combination therewith a butane boiling range gaseous stream, a mixed $C_3/C_4$ stream, naphtha product of catalytic cracking, reformate, dry gas from the catalytic plant absorber, off gas from hydrocracking or reforming as well as a butane or lighter stream from an isomerization plant or alkylation unit.

The catalyst mixture and/or compositions suitable for use in this invention comprise a mixture of small pore and large pore crystalline aluminosilicate in combination with one another and these may be composited from substantially any high activity large pore crystalline zeolite cracking component in admixture with, for example, a ZSM-5 type of catalyst composition. The ZSM-5 type catalyst composition is a smaller average pore diameter material than, for example, a rare earth exchanged X or Y crystalline zeolite.

The large and small pore crystalline zeolites above discussed are dispersed in a separate or a common matrix material suitable for encountering relatively high temperatures contemplated in the fluid cracking operation of this invention with its attendant catalyst regeneration operation. The catalyst mixture or composition suitable for use in this invention will catalyze the conversion of the various components of the hydrocarbons fed including normal paraffins to produce gasoline components as well as LPG types of gaseous materials. Thus the catalysts suitable for this invention have activity for cracking several different kinds or types of hydrocarbons found in gas oil boiling material in combination with a very selective cracking of normal paraffins and singly branched hydrocarbons which are upgraded to desired higher boiling components.

The novel process combination of this invention relies upon using a catalyst combination comprising a mixture of separate catalyst particles or a homogenous mixture thereof supported by a common matrix material and comprising at least two separate crystalline zeolite components, wherein each component acts substantially independently as herein defined upon given hydrocarbon components and each catalyst component is relied upon substantially to support the function of the other. Thus it is contemplated employing as the catalyst composition, a large pore crystalline aluminosilicate having a pore size in excess of about 9 A. as a major component with the minor component being a small pore crystalline component having a maximum pore size not exceeding about 9 A. and preferably being less than about 7 A. On the other hand, the large and small pore zeolites may be used in substantially equal amounts or the smaller pore crystalline zeolite may be in a major proportion. The small pore crystalline zeolite is preferably a ZSM-5 type of crystalline material such as that described in copending application 865,472 filed Oct. 10, 1969 now U.S. Pat. No. 3,702,886 issued Nov. 14, 1972.

The large pore crystalline zeolite may be any of the known crystalline aluminosilicates suitable for cracking hydrocarbons and providing a pore size in excess of 8 A. which composition has the ability to act upon substantially all the components usually found in a gas oil feed boiling in the range of 500°F. up to 950° or 1100°F. Large pore zeolites of this type are well known and include materials or synthetic faujasite of both the X and Y type as well as zeolite L. Of these materials zeolite Y is particularly preferred.

The crystalline zeolites above identified may be exchanged, combined, dispersed or otherwise intimately admixed with a porous matrix. By porous matrix it is intended to include inorganic and organic compositions with which the crystalline aluminosilicates may be affixed. The matrix may be active or substantially inactive to the hydrocarbon conversion reactions encountered. The preferred porous matrix may be selected from the group comprising inorganic oxides such as clay, acid treated clay, silicaalumina etc.

In the combination of this invention the small pore crystalline zeolite component of the catalyst is relied upon for promoting new ring formations and/or forming alkyl aromatics in a manner which may be made to increase or decrease with changes in reaction temperatures and residence time. Generally the higher temperatures promote aromatizing of olefins with lower temperatures promoting the formation of alkyl aromatics.

In yet a further embodiment it is contemplated combining the ZSM-5 type catalyst with a porous matrix as suggested above and an oxidation catalyst suitable for converting carbon monoxide to carbon dioxide. The oxidation component may be copper, chromium, nickel, manganese oxide or copper chromite and may comprise from one tenth to three weight percent of the catalyst inventory. Thus separate particles of catalyst, one comprising ZSM-5 and an oxidation catalyst such as chromium oxide dispersed in a suitable material is used in conjunction with another particle comprising catalytically active X or Y faujasite dispersed in a suitable matrix material to form a mixture of catalyst particles which are circulated in the system herein discussed for the reasons discussed. The use of separate catalyst particles as above provided is highly advantageous by permitting a change in the ratio of one type of catalyst particle to the other as a function of product desired and recovery of heat for use in the operation.

In an investigation going to the very essence of this invention it has been found that $C_9$ aromatics formed by the interception of $C_3$ fragments of cracking with mono-cyclic aromatics is a reaction product and as the reaction severity is increased by either raising the temperature or increasing the contact time, redistribution of alkyl groups takes place yielding aromatics both lighter and heavier than this reaction product.

A further significant observation contributing to the operational concepts of this invention is the finding that the high temperature cracking of the gas oil feed does not significantly deactivate the activity and selectivity of a smaller pore ZSM-5 crystalline component used in combination therewith. Furthermore, the presence of a carbon monoxide oxidation component with the ZSM-5 type component is not undesirably influenced by coke deposition and thus particles comprising this combination can function substantially independently to perform their separate and desirable reaction mechanisms in the overall combination operation relying upon the total mass of circulated catalyst particles as a heat sink for promoting the desired endothermic conversion reactions. When the oxidation component is combined with the mixture of zeolite catalysts above described a significant heat release benefit is realized by the exothermic conversion of CO to $CO_2$ during regeneration of the catalyst.

The small pore crystalline zeolite catalyst material preferred in the combination of this invention is preferably of the ZSM-5 type and as such the small pore has a uniform pore size varying because of its elliptical shape from about 5.5 A. up to about 6 and about 9 A. units.

A further embodiment of this invention resides in the use of a single porous matrix material as the sole support for the two different pore size crystalline zeolites either with or without an oxidation promoter as above discussed. Thus the catalyst may comprise an aluminosilicate of the ZSM-5 type in combination with a crystalline aluminosilicate having a pore size generally larger than that of ZSM-5 and more usually greater than 8 A. units in a porous matrix as a homogenous mixture in such proportions that the resulting product contains from about 1 percent up to about 95 percent by weight and preferably from about 10 to 50 percent by weight of total crystalline aluminosilicates in the final composite.

The particular proportions of one aluminosilicate component to the other in the catalyst system or composition herein defined is not narrowly critical and even though it can vary over an extremely wide range it has been found that the weight ratio of the ZSM-5 type aluminosilicate to the large pore size aluminosilicate can range from 1:10 up to 3:1 and preferably should be from about 1:3 to 1:1.

Hydrocarbon charge stocks which may be converted by the combination and method of this invention comprise petroleum fractions having an initial boiling point of at least 400°F. and an end point of at least 600°F. and as high as 950° to 1100°F. The present invention also contemplates the cracking of naphtha such as straight run naphtha and reformates boiling in the range of $C_5$ hydrocarbons up to about 400°F. as well as heavy naphtha products of cracking operations to improve its octane rating and produce significant quantities of LPG type materials as well as gasoline product with the LPG type material used in the ZSM-5 contact stage of the combination. Hydrocarbons boiling above 400°F. include gas oils, residual oils, cycle stocks, whole topped crudes and heavy hydrocarbon fractions derived by destructive hydrogenation processes.

BRIEF DESCRIPTION OF THE DRAWING

The drawing diagrammatically depicts a schematic arrangement of a reaction system comprising a first and second riser reactor in combination with a catalyst regenerator.

DISCUSSION OF SPECIFIC EMBODIMENTS

Referring now to the drawing by way of example there is shown a combination of processing steps comprising a first dispersed catalyst phase riser reactor for converting, for example, gas oil at a high temperature above about 1000°F. and a second riser reactor for converting a $C_3$ containing feed with hot catalyst particles transferred in the combination including stripping of catalyst separated from each riser reactor, regeneration of stripped catalyst particles and return of regenerated catalyst to at least the first riser reactor. Provisions are made for passing regenerated catalyst either directly to the second riser as the sole source of catalyst or with catalyst separated from the first riser reactor or catalyst separated from the first riser may alone be cascaded to the second riser reactor. It is also contemplated, although not shown by the drawing, of passing stripped catalyst directly to the regenerator as by a riser regeneration stage which discharges in an upper portion of an enlarged dense fluid bed regeneration zone and above a dense fluid catalyst bed phase therein or substantially at the interface of the dense catalyst bed phase with a dilute phase of catalyst thereabove. On the other hand, a plurality of riser regenerators may be employed in sequential or parallel flow arrangement.

In the arrangement of the FIGURE a gas oil feed is introduced to the combination by conduit 2, mixed with hot regenerated catalyst comprising ZSM-5 type crystalline aluminosilicate in admixture with a crystalline aluminosilicate of much larger pore size such as X or Y faujasite as hereinbefore described in conduit 4 containing flow control valve 6 to form a suspension of catalyst particles in oil vapors which pass upwardly through a first riser reactor 8 maintained at an elevated temperature of at least 1000°F. The catalyst mixture employed in the first riser reactor may comprise from 0.5 to 25 weight percent of the catalyst with the second cracking component (such as a Y faujasite cracking component) comprising from 0.1 to 30 weight percent of the catalyst mixture used therein. Riser 8 discharges directly into a cyclone separator 10 housed in the upper portion of vessel 12. In cyclone separator 10 hot catalyst is separated from hydrocarbon product of cracking. Separated hydrocarbon vapors pass into plenum chamber 14 and are removed therefrom by conduit 16 for separation in downstream equipment not shown. Catalyst separated in cyclone 10 is conveyed by dipleg 18 into a bed of catalyst 20 therebelow. In one arrangement it is contemplated passing hot catalyst separated from riser reactor 8 by conduit 22 substantially directly to the inlet of a second riser reactor 24. In yet another embodiment only freshly regenerated catalyst is passed to the inlet of riser 24 as by conduit 26 or a mixture of catalyst obtained from conduits 22 and 26 may be introduced to riser 24. In any event a $C_3$ rich stream is introduced by conduit 28 to riser 24 for admixture with catalyst introduced as above described to form a suspension. In riser 24 a suspension of the catalyst mixture and a $C_3$ containing feed is caused to be formed providing a mix temperature selected from within the range of 500° to 1000°F. The catalyst-hydrocarbon suspension thus formed is caused to move through the riser under conditions including a space velocity selected from within the range of 0.1 up to about 150 thereby causing the formation of cyclic hydrocarbons and/or alkyl aromatic ring structures. Thus riser 24 may be operated as a substantially more dense catalyst phase operation than the first riser reactor as suggested above and thus may be of a larger diameter than that relied upon for riser 8 in order to provide adequate contact time and more severe operating conditions within the desired operating constraints of the process combination. The ZSM-5 component of the catalyst mixture may comprise from 0.5 to 6 weight percent of the total catalyst mixture in the second riser. The second larger pore size crystalline cracking component used therewith as defined hereinbefore may be from 0.1 to 25 weight percent of the total catalyst mixture in riser 24. Thus it is contemplated providing for separate addition of either catalyst component to the catalyst mixture used to form a suspension in riser 24. In any event a suspension of the desired catalyst mixture and hydrocarbon vapors is formed and caused to move upwardly through riser 24 under preselected and desired temperature and space velocity conditions herein provided for before discharge of the suspension into a separator chamber or into a cyclone separator 30 with dipleg 32 provided within the upper portion of vessel 12. Thus as discussed above the reactions promoted in riser 24 may be at a temperature substantially equal to or below that employed in riser 8 and catalyzed essentially by the ZSM-5 component of the catalyst mixture with the second catalyst component used therewith acting primarily as a heat sink. Catalyst discharged from dipleg 18 and 32 is collected in the lower portion of vessel 12 as a fluid bed of catalyst particle 20 moving generally downwardly through the vessel and through a stripping zone provided in the lower most portion of the vessel 12. Stripping gas is added to the lower portion of the stripping zone by conduit 34. It is also contemplated adding a third hydrocarbon feed material of relatively wide boiling range or restricted boiling range to a lower portion of the collected fluid bed of catalyst to accomplish, for example, cracking of cycle stock of other high boiling material to achieve a further deposition of carbonaceous material on the catalyst particles.

On the other hand, a $C_3$ containing hydrocarbon charge may be introduced along with an aromatic rich charge to promote the formation of alkyl aromatics in the dense fluid bed of catalyst 20 in vessel 20 by conduit 36 substantially below the upper interface of the dense catalyst phase as shown. Thus it is contemplated adding feed three to the bed of catalyst above the discharge from dipleg 32 as by branched inlet conduit 38 or below the discharge as by conduit 36. Furthermore, the catalyst bed in the upper portion thereof will be of a slightly higher temperature due to the high temperature of the catalyst discharged from the first riser as by dipleg 18 and this higher temperature condition may be used to advantage in converting the third feed materials. As suggested above feed three may vary considerably depending on that desired to be accomplished and thus the feed may be light gases obtained from a fluid cracking light ends recovery unit, virgin naphtha, fluid cracking naphtha product, thermal naphtha product, natural gas constituents, natural gasoline, reformates, a gas oil, or a residual oil of high coke producing characteristics as above defined. Hydrocarbon conversion products and stripping gas is caused to move from the catalyst bed through cyclone 40 provided with dipleg 42. Gasiform products of conversion and stripping gas are removed by conduit 16 for transfer to a product fractionator.

Catalyst particles comprising particularly the X or Y crystalline cracking component utilized in the system of the invention attains a relatively high level of hydrocarbonaceous material on the catalyst particles which is subsequently removed by regeneration with oxygen containing regeneration gases. The stripped catalyst particles are passed by conduit 44 to catalyst regeneration represented by regenerator 46 containing a dense fluid bed of catalyst 48. Regeneration gas such as air is introduced to the lower portion of regenerator 46 by air distributor 50 supplied by conduit 52. Cyclone separators 54 provided with diplegs 56 separate entrained catalyst particles from flue gases and return the separated catalyst to the fluid bed of catalyst. Flue gases pass from the cyclones into a plenum chamber and are removed therefrom by conduit 58. Regenerated catalyst is returned to the conversion system by conduits 26 and 4 as discussed above.

The regenerator system of the invention may be modified to include a first stage riser regenerator which discharges directly into a dispersed catalyst phase in the upper portion of the regenerator or directly into a cyclone separator positioned in the dispersed catalyst phase. On the other hand, the riser may discharge just below the interface of the dispersed phase with the dense phase of catalyst. The regenerator system of the figure may be replaced by a plurality of sequentially arranged separate catalyst phases undergoing regeneration such as a plurality of sequentially arranged catalyst phases comprising dilute phases alone or in combination with a dense catalyst phase. For example, it is contemplated passing a mixture of spent catalyst and freshly regenerated catalyst upwardly through a first riser regenerator and completing regeneration of the catalyst in either a second riser reactor, a dense fluid bed of catalyst or a combination thereof which will be suitable for the purpose. In any of these arrangements of catalyst regeneration the catalyst particles are heated to an elevated temperature in the range of 1200°F. to 1400°F. by the burning of carbonaceous material.

In accordance with the concepts hereinbefore presented, it has been visually observed of a catalyst mixture comprising separate particles of "Y" faujasite cracking component in admixture with particles of ZSM-5 type catalyst that essentially the major portion of the deposited coke forms on the particle containing the "Y" faujasite cracking component. The ZSM-5 type catalyst particles on the other hand appeared clean by comparison and could be hand separated. Accordingly adding an oxidation catalyst such as chromium oxide to the ZSM-5 type particle to promote the conversion of carbon monoxide to carbon dioxide without appreciably affecting the hydrogen in the coke laid down on the faujasite cracking component was pursued. The oxidation promoter is therefore effective in yielding a higher carbon dioxide to carbon monoxide ratio in the flue gases and therefore a greater heat release in the regenerator to the catalyst is realized. Thus by restricting the amount of oxidation promoter in the catalyst as identified above no appreciable effect on the cracking operation is observed even though the amount of oxidation promoter is large enough to achieve an advantage in the conversion of carbon monoxide in the regeneration system.

A concept of the invention herein described is concerned with regeneration of the catalyst in a manner which will enhance the recovery of available heat as by increasing the ratio of carbon dioxide to carbon monoxide in the regenerator flue gas through combustion and recovering the heat thus generated as by direct heat exchange with catalyst particles. To promote the conversion of carbon monoxide to carbon dioxide an oxidation catalyst promoter was combined with the ZSM-5 type catalyst particle component because of low coke deposition thereon. From the Arthur Curve (Arthur, J. R. Transactions, Faraday Society, Vol. 47, page 164, 1951) it is ascertained that the $CO_2/CO$ ratio at 1100°F. is 0.6. However, when subjecting a cracking catalyst comprising 15 percent by weight REY dispersed in a silica-zirconia clay matrix to regeneration at the same temperature of 1100°F. after deposition of coke thereon a $CO_2/CO$ ratio of 0.57 was obtained. However the same cracking catalyst in admixture with separate particles comprising $Cr_2O_3$ in an amount equivalent to 0.34 percent by weight $Cr_2O_3$ produced during regeneration a $CO_2/CO$ ratio of 0.75. On the other hand, providing the REY zeolite cracking catalyst particle with 0.34 percent by weight $Cr_2O_3$ produced during regeneration a $CO_2/CO$ ratio of 0.87. The higher $CO_2/CO$ ratio obtained is indicative of the enhanced conversion of carbon monoxide by the oxidation catalyst thereby improving upon the generation of heat available in the process. The regeneration steps of the present invention are directed to recovering by direct heat exchange with the catalyst, the increased heat released by the exothermic conversion of CO to $CO_2$.

A combination process for producing gasoline employing the concepts of the hereinbefore defined invention was investigated. In this investigation, catalytic cracking under conditions giving high $C_3^=$ and $C_4^=$ yields was practiced followed by passing all or a part of the dry gas stream through an aromatizing zone relying upon the aromatizing characteristics of a catalyst of the ZSM-5 type.

The data of Table 1 identify the type of hydrocarbons passed to the aromatizing step. These data show an efficiency of 50–80 percent conversion of olefins to aromatics. Higher efficiencies are possible by dilution of the hydrocarbon charge to the aromatizing step with, for example, light paraffins such as $C_3$ or $C_4$ paraffins.

The data of Table 2 show how the efficiency improves with added propane.

Table 3 data show that in high temperature riser cracking an advantage is obtained with or without added HZSM-5 type zeolite, namely, a small yield loss for a gain in octane number. Table 4, on the other hand, presents data to show the advantage of this combination process (fluid cracking plus ZSM-5 aromatization) over fluid cracking alone.

Table 1

Dry Gas Aromatization

Charge: $C_3^=/C_3/C_2^=/C_2$ :: 65/15/10/10
Catalyst: CR/HZSM-5

| Time on Stream, min. | 1.3 | 25.3 | 46.3 | | 2.2 | 24.9 | 49.0 | | | | |
|---|---|---|---|---|---|---|---|---|---|---|---|
| Run Number | 1018 | | | | | | | | | | |
| Sample No. | 1 | 2 | 3 | | 4-R1 | 5-R1 | 6-R1 | | 7-R2 | 8-R2 | 9-R2 |
| Temperature | 1100 | 1100 | 1100 | | 1100 | 1100 | | | 1100 | | |
| WHSV | 0.79 | 0.77 | 0.80 | | 1.61 | 1.61 | | | 0.80 | 0.80 | 0.80 |
| Wt.% Recovered | 99.9 | 100.5 | 99.9 | | 100.9 | 95.3 | | | | | |
| Wt.% Liq. Prod. | 52.7 | 50.6 | 43.0 | Regeneration—Air 950°F. | 46.2 | 38.0 | 23.7 | Regeneration—Air 950°F. | 59.5 | 50.2 | 44 |
| Wt.% Arom. in Liq. | 98.9 | 98.4 | 97.4 | | 98.5 | 97.3 | 80 | | 99.6 | 98.7 | 96.5 |
| Av. Mole Wt. Arom. | 91.5 | 92.6 | 93.5 | | 91.8 | 92.6 | | | | | |
| Wt.% Olefins to Arom. | 71.5 | 69.8 | 58.4 | | 66.0 | 53.2 | | | | | |
| Calc. Based on 100 g. Charged | | | | | | | | | | | |
| $C_1$ | 16.1 | 11.6 | 6.5 | | 11.8 | 6.9 | | | | | |
| $C_2^=$ | 4.7 | 5.6 | 7.8 | | 5.6 | 9.6 | | | | | |
| $C_2$ | 20.3 | 20.4 | 19.4 | | 17.4 | 18.3 | | | | | |
| $C_3^=$ | 1.6 | 2.7 | 5.0 | | 8.5 | 6.0 | | | | | |
| $C_3$ | 4.2 | 9.3 | 17.0 | | 10.6 | 15.3 | | | | | |
| $C_4^=$ | 0.1 | 0.2 | 0.6 | | 0.7 | 0.1 | | | | | |
| $C_4$ | 0.2 | 0.2 | 0.7 | | 0.2 | 0.6 | | | | | |
| $C_5^=$ | — | — | — | | — | 0.3 | | | | | |
| $C_5$ | — | — | — | | — | — | | | | | |
| Paraffins in Liquid | 0.6 | 0.8 | 1.1 | | 0.7 | 1.0 | | | | | |
| Benzene | 18.0 | 14.6 | 9.4 | | 14.3 | 8.9 | | | | | |
| Toluene | 21.2 | 21.2 | 19.4 | | 19.6 | 17.6 | | | | | |
| Xylene | 6.7 | 7.8 | 9.2 | | 6.5 | 7.6 | | | | | |
| Total $C_9$ | 0.9 | 1.8 | 1.5 | | 1.3 | 1.0 | | | | | |
| Indane | 0.2 | 0.2 | 0.2 | | 0.2 | 0.2 | | | | | |
| Total $C_{10}$ | 0.6 | 0.8 | 0.6 | | 0.7 | 0.5 | | | | | |
| Naphthalene | 1.4 | 1.2 | 0.6 | | 0.9 | 0.4 | | | | | |
| Total $C_{11}+$ | 3.1 | 2.2 | 1.0 | | 2.0 | 0.7 | | | | | |

Table 2

| $C_3^=/C_3$ | 100/- | 53/44 | 41/52 | 58/36 | 74/22 | $66C_3^=/23C_2^=$ |
|---|---|---|---|---|---|---|
| Catalyst | HZSM-5 | HZSM-5 | Cr/HZSM5 | Cr/HZSM5 | Cr/HZSM5 | Cr/HZSM5 |
| Run Number | 1011 | 1012 | 1013 | 1014 | 1014 | 1015 |
| Sample No. | 1 | 1 | 1 | 1 | 2 | 1 |
| Temperature | 1100/950 | 1100/950 | 1100/950 | 1100/950 | 1100/950 | 1100/950 |
| WHSV | 0.81 | 0.86 | 0.83 | 0.84 | 0.89 | 0.74 |
| Wt.% Recovered | 102.2 | 99.0 | 102.3 | 111.8 | 101.7 | 103.5 |
| Wt.% Liq. Prod. | 63.2 | 43.1 | 47.4 | 49.8* | 56.5 | 63.3 |
| Wt.% Arom. in Liq. | 98.7 | 97.7 | 97.9 | 97.7 | 97.9 | 98.6 |
| Av. Mol Wt.Arom. | 92.7 | 92.8 | 93.3 | 92.9 | 92.7 | 92.2 |
| Wt.% Olefins to Arom. | 72.5 | 80.2 | 112.8 | 84.1 | 75.6 | 71.0 |
| Calc. Based on 100 g. Charge | | | | | | |
| $C_1$ | 11.1 | 14.6 | 18.2 | 13.5 | 13.4 | 12.0 |
| $C_2^=$ | 1.7 | 1.7 | 2.2 | 1.8 | 2.0 | 1.8 |
| $C_2$ | 10.2 | 11.6 | 12.5 | 9.5 | 10.7 | 11.6 |
| $C_3^=$ | 7.3 | 11.2 | 6.9 | 10.8 | 6.5 | 3.5 |
| $C_3$ | 7.3 | 15.5 | 14.1 | 14.3 | 12.1 | 10.6 |
| $C_4^=$ | 0.6 | 0.2 | 0.2 | — | — | — |
| $C_4$ | 0.6 | 1.0 | 0.8 | .5 | 0.4 | 0.6 |
| $C_5^=$ | — | — | — | — | — | — |
| $C_5$ | 0.2 | — | — | — | — | — |
| Paraffins in Liq. | 0.8 | 1.0 | 1.0 | 1.1 | 1.2 | 0.9 |
| Benzene | 19.3 | 11.9 | 13.4 | 14.1 | 16.0 | 19.6 |
| Toluene | 25.4 | 17.8 | 19.0 | 20.2 | 23.3 | 25.6 |
| Xylene | 9.1 | 7.1 | 7.3 | 7.9 | 9.0 | 9.3 |
| Total $C_9$ | 2.2 | 1.8 | 1.8 | 2.0 | 2.2 | 2.1 |
| Indane | 0.4 | 0.3 | 0.3 | 0.4 | 0.4 | 0.4 |
| Total $C_{10}$ | 0.8 | 0.7 | 0.8 | 0.8 | 0.9 | 1.3 |
| Naphthalene | 1.5 | 0.7 | 1.1 | 1.0 | 1.1 | 1.0 |
| Total $C_{11}+$ | 3.8 | 1.7 | 2.8 | 2.3 | 2.4 | 3.1 |

*Calc. based on recovered product because of poor "Balance Data".

Table 3

High Temperature Riser Cracking Followed
By Propylene Aromatization and C₄ Alkylation
(at 73.7% Conversion: 1040°F)[1]

|  | 10% REY | | 10% REY/5% ZSM-5 | |
|---|---|---|---|---|
| $C_5+$ Gasoline, Vol.% | 57.0 | | 54.1 | |
| $C_3$" Aromatizate, Vol.%[2] | [5] | 3.3 | 0.9 | 3.8 |
| Alkylate, Vol.% | 30.5 | 18.3[3] | 30.5[4] | 20.6[3] |
| Total Gasoline, Vol.% | 87.5 | 78.6 | 85.5 | 78.5 |
| Outside i-C₄ required, Vol.% | 14.3 | 4.9 | 14.2 | 5.4 |
| Total Gaso., RON, Clear | 90.9 | 93.0 | 92.3 | 94.0 |
| Equiv. Gaso. Loss/Octane No. Gain | | +2.7/+2.1 | −2.0/+1.4 | −3.5/+3.1 |

[1] Calculations based on cracking data.
[2] Assuming 60% (wt.) efficiency to aromatics. Calculated RON, clear of aromatizate is 124.
[3] Only butylenes are alkylated. All propylene goes to aromatization.
[4] Butylenes and enough propylene to give same vol. alkylate as base case are alkylated. Rest of propylene to aromatizate.
[5] Base case for comparisons.

Table 4

|  | FCC Cracking Followed by Propylene Aromatization + C₄=Alkylation (at 73.7% Conversion; 960°F)[1] | | | | | |
|---|---|---|---|---|---|---|
|  | 10% REY | | +5% ZSM-5 | | +10% ZSM-5 | |
| $C_5+$ Gasoline, Vol.% | 59.2 | | 54.9 | | 49.2 | |
| $C_3$" Aromatizate, vol.%[2] | [5] | 3.0 | 1.7 | 4.4 | 2.1 | 5.6 |
| Alkylate, Vol.% | 24.2 | 11.0[3] | 24.2[4] | 11.9[3] | 24.2[4] | 13.7 |
| Total C₅+ Gasoline | 83.4 | 73.2 | 80.8 | 71.2 | 75.5 | 68.5 |
| Outside iC₄, vol.% | +8.7 | −0.9 | +8.0 | −0.3 | +5.7 | −1.3 |
| RON, Clear | 89.3 | 90.2 | 92.4 | 93.6 | 93.0 | 95.6 |
| Equiv. Gaso. Loss/O.N. Gain | | −3.8/+0.9 | −3.1/+3.1 | −6.2/+4.3 | −5.9/+3.7 | −8.9/+6.3 |

[1] Calculations based on cracking data.
[2] Assuming 60% efficiency of propylene aromatization. Octane number of this aromatizate calculated to be 124 RON, clear, from compositional data.
[3] Only the butylenes are alkylated. All propylene gives to aromatization.
[4] Enough propylene is alkylated to give same vol. alkylate as base case, the remainder goes to aromatization.
[5] Base case for comparisons.

Having thus provided a general discussion of the present invention and described specific embodiments in support thereof, it is to be understood that no undue restrictions are to be imposed by reasons thereof except as provided by the following claims.

We claim:

1. A method for converting hydrocarbons with a dual function conversion catalyst comprising a large pore faujasite type crystalline zeolite cracking component and a crystalline aluminosilicate of the ZSM-5 type having a pore size restricted to within the range of 5 to 9 Angstroms which comprises, cracking a gas oil feed with said dual function catalyst particles in a first dispersed catalyst phase conversion zone at a temperature selected from within the range of 1000°F. to 1200°F. at a catalyst residence time of not more than about 5 seconds, converting a $C_3$ containing hydrocarbon feed in a second separate dispersed catalyst phase conversion zone in the presence of said dual function catalyst particles, a portion of which was used in said first conversion zone at a temperature within the range of 500° to 1000°F. relying upon a catalyst residence time in excess of 5 seconds, recovering catalyst particles separated from each of said first and second conversion zones as a dense fluid bed of catalyst particles, stripping the dense fluid bed of catalyst particles of vaporous hydrocarbons, regenerating the stripped catalyst to remove deposited hydrocarbonaceous material, passing regenerated catalyst to at least said first conversion zone, and contacting particles of catalyst separated from said first conversion zone in said second conversion zone at a temperature less than 1000°F. with a $C_3$ containing hydrocarbon material obtained as a portion of the product of said first conversion zone.

2. The method of claim 1 wherein the $C_3$ containing feed is in combination with a hydrocarbon selected from the group consisting of a butane containing gaseous stream, a naphtha product of cracking and reforming, off gas from hydrocracking and reforming, and light gaseous material separated from isomerization and alkylation.

3. The method of claim 1 wherein the temperature is restricted to within the range of 500° to 700°F. in the second conversion zone and the $C_3$ containing feed is provided with aromatic constituents suitable for forming alkyl aromatics during traverse of the second conversion zone in contact with the ZSM-5 type of catalyst.

4. The method of claim 3 wherein the catalyst particles passed to said second conversion zone comprise essentially catalyst separated from said first conversion zone.

5. The method of claim 1 wherein the second conversion zone temperature is maintained above 700°F. essentially by the catalyst separated from said first conversion zone.

6. The method of claim 1 wherein the reactions in the second conversion zone are promoted by catalyst particles removed from the first conversion zone in admixture with freshly regenerated catalyst particles at a residence time substantially longer than that relied upon in the first riser reactor.

7. The method of claim 1 wherein the dense fluid bed of catalyst is relied upon in an upper portion thereof for converting hydrocarbon feed higher boiling than that charged to each conversion zone and is thereafter stripped of vaporous hydrocarbons before passage of the catalyst to the regeneration step.

8. The method of claim 1 wherein a third hydrocarbon feed comprising $C_3$ hydrocarbons is added to the dense fluid bed of catalyst in a region of temperature suitable to catalyze the cyclization of $C_3$ hydrocarbons.

9. The method of claim 8 wherein the third hydrocarbon feed is selected from the group consisting of light gases from fluid cracking; naphtha product of cracking, reforming, natural gas condensate, and straight run naphtha; and gas oil boiling range material.

10. A method for converting hydrocarbons to form gasoline, aromatics and alkyl aromatics which comprises, cracking high boiling hydrocarbon material admixed with a ZSM-5 crystalline zeolite and a larger pore crystalline aluminosilicate catalyst composition of different activity and selectivity characteristic in a first dispersed phase riser reaction zone at a temperature above 1000°F. relying upon a catalyst residence time less than 5 seconds, separating the effluent of said first reaction zone into a catalyst phase, and a hydrocarbon phase comprising $C_3$ hydrocarbons, passing a feed comprising monocyclic aromatics admixed with $C_3$ hydrocarbons recovered from the hydrocarbon phase of said first reaction zone with said catalyst composition through a second separate reaction zone maintained at a temperature below 1000°F. relying upon a residence time sufficient to form cyclic compounds and alkyl aromatics therein, separating an effluent of said second reaction zone into a hydrocarbon phase and a catalyst phase, recovering catalyst from said first and second reaction zone as a fluid bed of catalyst, converting a third hydrocarbon feed comprising $C_3$ hydrocarbons in said fluid bed of catalyst before regenerating the catalyst therein, and passing catalyst separated from said first reaction zone through said second and third reaction zones.

* * * * *